United States Patent [19]
Kauppi

[11] Patent Number: 6,032,042
[45] Date of Patent: *Feb. 29, 2000

[54] CELLULAR RADIO NETWORK HAVING MOBILE RADIO STATION USER-ACTIVATED UNLOCKING OF PREVENTION OF LOCATION-UPDATING FEATURE

[75] Inventor: Hanna-Maria Kauppi, Espoo, Finland

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/397,175
[22] PCT Filed: Sep. 9, 1993
[86] PCT No.: PCT/FI93/00360
  § 371 Date: May 1, 1995
  § 102(e) Date: May 1, 1995
[87] PCT Pub. No.: WO94/06219
  PCT Pub. Date: Mar. 17, 1994

[30] Foreign Application Priority Data

Sep. 10, 1992 [FI] Finland .................................... 924060

[51] Int. Cl.[7] ........................................ H04Q 7/24
[52] U.S. Cl. .................. 455/432; 455/435; 455/575; 455/552; 455/525
[58] Field of Search ................. 455/33.1, 33.2, 455/33.4, 54.1, 56.1, 34.1, 432, 33, 435, 550, 575, 552, 525; 379/59

[56] References Cited

U.S. PATENT DOCUMENTS

| | | | |
|---|---|---|---|
| 4,905,301 | 2/1990 | Krolopp et al. | 455/33.4 X |
| 5,159,625 | 10/1992 | Zicker | 455/552 X |
| 5,212,822 | 5/1993 | Fukumine et al. | 455/33.1 |
| 5,442,680 | 8/1995 | Schallinger et al. | 455/33.4 X |
| 5,487,174 | 1/1996 | Persson | 455/33.2 |

FOREIGN PATENT DOCUMENTS

| | | |
|---|---|---|
| 439628 | 8/1991 | European Pat. Off. . |
| 465444 | 1/1992 | European Pat. Off. . |
| 90182 | 9/1993 | Finland .......................... H04Q 7/04 |
| 4107998 | 9/1992 | Germany . |
| 466374 | 2/1992 | Sweden . |
| 467559 | 8/1992 | Sweden . |
| 92/19078 | 10/1992 | WIPO . |

Primary Examiner—Wellington Chin
Assistant Examiner—Philip J. Sobutka
Attorney, Agent, or Firm—IP Group of Pillsbury Madison & Sutro LLP

[57] ABSTRACT

A cellular radio network including mobile radio stations is provided in which at least some of the mobile radio stations are capable of moving in a primary network, and in at least one other network having a location area configuration different from that of the primary network. The user can manually prevent all location updatings and location updating attempts between the different networks and, thus, temporarily "lock" the use of the mobile station within a particular network. Not even an location updating attempt into a "foreign network" is made. It is up to the user of the mobile station to decide when the user activates the registration function. The locking function remains activated until deactivation by the user. Subsequent to the deactivation, location updatings between the networks are performed in a normal manner.

20 Claims, 2 Drawing Sheets

CELLULAR RADIO NETWORK HAVING MOBILE RADIO STATION USER-ACTIVATED UNLOCKING OF PREVENTION OF LOCATION-UPDATING FEATURE

FIELD OF THE INVENTION

The invention relates to a cellular radio network and especially to improved location updating in cellular networks.

BACKGROUND OF THE INVENTION

Base stations of a cellular radio network broadcast information about themselves and their environment continuously. Such network configuration information may contain, for instance a location area identifier, a base station identifier, a base station type identifier and so-called neighboring cell information. When being currently registered to a base station of a particular cell, a mobile station also monitors the quality of the transmission of the base stations indicated by the neighboring cell information of the current base station and moves to some of these base stations if the field strength of the present base station becomes lower. The cellular network knows the location of the mobile station usually with an accuracy of a so-called location area, to which belong a suitable number of predetermined cells with their base stations. The location area information sent by the base station indicates to the mobile station to which location area the base station belongs. When the mobile station moves to another cell within the same location area, no location updating is needed in the cellular network. On the other hand, upon observing on the basis of location area information a change of location area when moving to a coverage area of a new base station, the mobile station initiates a location updating by sending a location updating request to the cellular network. As a consequence of this location updating request, the cellular network stores the new location area of the mobile station in subscriber registers.

In the future, it is conceivable that both public cellular networks maintained by different operators and several kinds of private Customer Premises Networks (CPN) will be utilized, such as, for instance Business Customer Premises Networks (BCPN), Domestic Customer Premises Networks (DCPN), and Mobile Customer Premises Networks (MCPN). In such a situation, it would be preferable for the service of the networks that a mobile station would be capable of registering automatically or manually to these different networks. The public cellular networks and the CPNs would have separate location area structures. The amount of location updates would be high in such an environment, with the user moving from one place to another. In particular areas of the network, for instance at the edges of a private cellular network, signals of the other networks are so strong that a mobile station may try to initiate the location updates to an external network. Such location updates are unnecessary and annoying when the user wishes to remain registered within the area of a particular network, irrespective of received signal level, for instance. Moreover, unnecessary location updates and location updating attempts cause an unreasonable increase of the signaling load of the network.

SUMMARY OF THE INVENTION

The object of the present invention is to reduce unnecessary location updates and location updating attempts and thereby unnecessary signaling in a cellular radio network having a plurality of subnetworks.

According to one aspect of the invention, a cellular radio network, comprising a primary network having a first location area configuration, mobile radio stations capable of moving in the primary network from one location area to another, a mobile station starting a location updating procedure in the cellular network each time a changeover from one location area of the primary network to another is observed, is characterized in that at least some of the mobile stations are capable of moving, except in the primary network, in at least one other network having a second location area configuration differing from said first location area configuration, and that the mobile radio station comprises means, which, when activated by the user, temporarily prevent the mobile radio station from initiating location updates to other networks from the network used at the time of activation.

Another aspect of the invention is a mobile radio station for a cellular radio network, comprising a primary network having a first location area configuration, the mobile radio station being capable of moving in the primary network from one location area to another and starting a location updating procedure in the cellular network each time a changeover from one location area of the primary network to another is observed, characterized in that the mobile station is capable of moving, except in the primary network, in at least one other network having a second location area configuration differing from said first location area configuration, and that the mobile radio station comprises means, which, responsive to activation by the user, temporarily prevent the mobile station from initiating location updatings to other networks from the network used at the time of activation.

By means of the invention, the user may, if desired, manually prevent all location updates and location updating attempts between the different networks and thus temporarily "lock" the use of a mobile station within a particular network area. The locking of location updates between networks means that the user may move in the network selected by him from one location area to another, but location updates from one network to another (e.g., from a BCPN or DCPN to a public network or vice versa, or between public networks) are not performed under any circumstances. Not even an attempt is made to update locations into a "foreign network". The user of the mobile station is entitled to decide when he activates a locking function. For performing a locking function, the mobile station shall be capable of distinguishing the various networks from each other, which may occur, for instance, by means of a network-specific "locking code" sent by the base stations of the network, whereby all base stations of the same network send the same locking code. Alternatively, a network identifier may be included in the information sent by the base stations already or it may be derived from that. With the locking function activated, the mobile station monitors a change of location area and starts updating the location, if the locking code or the network identifier remains unchanged, but does not perform location updating, if the locking code or the network identifier changes. The locking function remains activated until the user deactivates it, and after that all location updates between the networks are performed in a normal manner.

By means of the invention, unnecessary location updates and location updating attempts between networks are prevented, and signaling resources and processing capacity of a cellular radio network are saved.

BRIEF DESCRIPTION OF THE DRAWINGS

The invention will be explained below by means of illustrative embodiments referring to the attached drawing, in which.

DETAILED DESCRIPTION OF A PREFERRED EMBODIMENT OF THE INVENTION

The present invention may be applied in any cellular radio system, for instance, a digital GSM mobile telephone system, an NMT (Nordic Mobile Telephone), a DCT1800, a PCN (Personal Communication Network), a UMC (Universal Mobile Communication), a UMTS (Universal Mobile Telecommunication System), an FPLMTS (Future Public Land Mobile Telecommunications System), etc.

As is well-known, the geographic area covered by a cellular radio network is divided into smaller separate radio areas, i.e., cells so that a Mobile Station MS, when in a cell, communicates with the network via a fixed radio station positioned in the cell, i.e., via a Base Station BS. The radio stations MS belonging to the system may roam freely in the system area from one cell to another. However, the cellular radio network maintains files of the location of the mobile station MS in order to be able to route calls terminating at the MS or to page it for some other reason. The cellular network typically knows the location of the MS with an accuracy of an area formed by one or a plurality of cells, which area is generally called a location area.

The base stations of a cellular network continually broadcast information of themselves and their surroundings, such as a Location Area Identifier (LAI), a Base Station Identifier (BSI), a Base Station Type Identifier (BSTI) and so-called neighboring cell information. On the basis of the neighbouring cell information broadcast by the respective base station BS, an MS registered to a cell knows the neighboring cells the transmission of whose base stations the MS should monitor. With weakening field strength of the present base station BS, the MS is registered to the best of these monitored neighboring base stations. On the basis of the location area identifier (LAI) of the base station, the MS knows to which location area the base station BS belongs. If the MS observes a change of LAI simultaneously with a change of base station BS, i.e., a change of location area is observed, the MS initiates location updating by sending a location updating request to the cellular network. If the location area does not change, the MS does not perform a location update.

A location update causes an update of subscriber data in a subscriber register/subscriber registers of a cellular network. In a GSM system, for instance, the cellular network contains at least a Home Location Register HLR, Visitors Location Registers VLR, mobile telephone exchanges MSC, and Base Station Controllers BSC, which are connected to the base stations BS of the network. Subscriber location area data are stored in a Visitors Location Register VLR; the number of these registers being typically one per each mobile telephone exchange. The HLR knows the VLR in the area of which the subscriber is currently located. As for this, the structure and operation of the GSM system are described in more detail in Finnish Patent 921074, for example.

Figure 1:
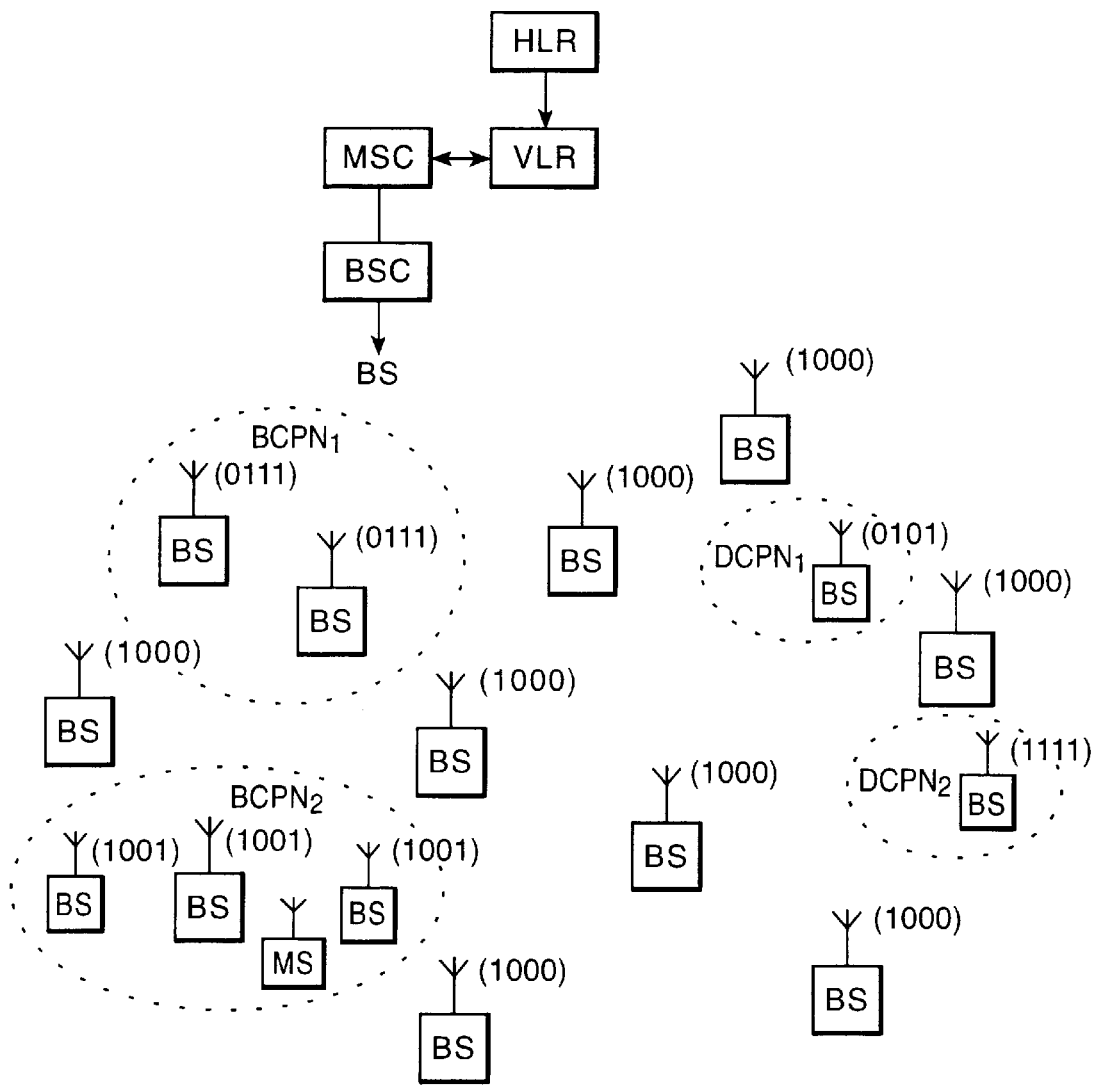
FIG. 1 illustrates one cellular radio network according to the invention and FIG. 2 is a general block diagram of one mobile station.

FIG. 1 presents a cellular radio network according to the invention, comprising a so-called public primary network and Customer Premises Networks (CPN) of several kinds, such as, for instance Business Customer Premises Networks (BCPN), Domestic Customer Premises Networks (DCPN), and Mobile Customer Premises Networks (MCPN). For the sake of clarity, FIG. 1 shows only two BCPNs and two DCPNs. The areas and base stations BS are illustrated by broken lines. A group of primary network base stations BS are shown around these CPNs. The public cellular network, i.e., the primary network, may be a conventional mobile telephone network, which offers the same services to all customers within the operating area of the entire cellular network. The CPNs again may be any other cellular networks situated in the area of the primary network or bounded by the primary network at its edges. Such CPNs are typically private, for instance business or corporation systems, and their radio coverage areas cover a relatively local area, e.g., a building site, a building or part thereof, such as one floor or office. Such CPNs may also be called small, sub, local or complementary networks, depending on their configuration and relation to the primary network in each particular case. As to the invention, the configuration of these other networks is not essential, if only at least part of the subscribers are able to use both the primary network and at least one CPN.

As stated earlier, the primary network and each CPN have separate location area structures, i.e., separate location areas. From this follows that the number of location updates increases considerably in this kind of network environment with a mobile station MS moving from one place to another. Part of the location updates and location updating attempts are unnecessary and undesired for the user and increase the signaling load of the network without cause. In particular areas of the network, for instance at the edge of a private network, signals of other networks are so strong that the MS may try to perform a location update to an external network. Such location updates are unnecessary and annoying when the user desires to remain registered in the area of a particular network irrespective of the received signal level or other criteria. The user may, if he desires, manually prevent all location updates and location updating attempts between the different networks and thus, lock the use of the mobile station MS temporarily within the area of a particular network. The locking prevents location updates between the networks so that the MS may roam in a selected network from one location area to another, but location updates from one network to another (e.g., from a BCPN or DCPN to a public network or vice versa, or between two public networks or between two private networks) are not performed under any circumstances. Not even an attempt is made to update the location to a "foreign network".

The user of the mobile station MS is entitled to decide when he activates the locking function of location updating. The user may wish to remain in a particular network, for instance for charging reasons in order to be able to utilize special services offered by this particular network or to prevent unnecessary location updates. The locking is activated manually e.g., by means of a key function or a function code, if the mobile station MS is provided with a particular function code for such a locking function.

To perform the locking function, the MS shall be capable of distinguishing the different networks from each other, which can be carried out, for instance, so that the base stations BS of the cellular network broadcast, in addition to the identifiers LAI, BSI, BSTI etc. mentioned earlier, also a network-specific "locking code". Thus, all base stations of the same network broadcast the same locking code. In FIG. 1, for instance, the base stations BS of the public primary network send a locking code (1000), the $BCPN_1$ sends a locking code (0111), the $BCPN_2$ sends a locking code (1001), the $DCPN_1$ sends a locking code (0101) and the $DCPN_2$ sends a locking code (1111).

Another alternative is that the information broadcast by the base stations BS contains the identifier of that network to which the base station belongs or the identifier may be derived from the broadcast information. Such an identifier may be formed, for instance by means of the Base Station Identifier BSI and the Base Station Type Identifier BSTI.

When the user activates, preferably manually, the locking function of location update of an MS, the MS stores the locking code sent by the current BS or the identifier of the network in a memory. In FIG. 1, for instance, the MS locked to the BS of the BCPN$_2$ stores the locking (1001) of the network in the activation situation. To facilitate the procedure of being locked to a correct network, the network used at present may be indicated by the MS to the user in a suitable manner, e.g., by presenting the name of the network on the display, by means of particular indicator lights, etc.

When the MS then moves in the area of the BCPN$_2$, it still observes the information sent by other networks, e.g., the primary network and the base stations BS of the BCPN$_1$. The MS monitors, in a normal manner, the quality of signals sent by the neighboring base stations BS and selects, when the field strength of the present base station becomes weaker, on the basis of predetermined criteria a new base station to which it might register. If the Location Area Identifier LAI received from the new base station BS is the same as that of the present base station, the location area does not change and a base station handover may be performed normally. If the MS observes that the location area identifier received from the new base station differs from the location area identifier LAI of the present base station BS, i.e., it observes a change of location area, the MS does not start update the location immediately, but compares the stored locking code/network identifier with the locking code/network identifier received from the new base station. If the stored locking code/network identifier and the received locking code/network identifier are identical, the MS initiates the location update, because the area in question is still the same network area to which the location update is locked. If the stored locking code/network identifier differs from the received locking code/network identifier, the MS identifies the new base station BS as a base station of a "foreign network" and the location update is not initiated. In FIG. 1, for instance, the locking of location update is activated by MS in the network BSPN$_2$, and consequently, the MS performs a location update when it moves from a base station to another within the BCPN$_2$, but does not under any circumstances perform a location update, for instance via the base stations of the primary network (locking code 1000) or the base stations of the BCPN$_1$ (locking code 0111), since they have different locking codes.

The locking function may be a voluntary function, which is not necessarily supported by all networks, and for this reason, they do not broadcast any locking code at all. In such a situation the MS, in which the locking of location update is activated, interprets the missing locking code as a different code and does not initiate the location update.

If a location update is prevented according to the invention at some base station, the MS remains registered to the present base station or selects by means of specific criteria, the next best base station and takes the measures according to the invention also for this new base station.

The locking of location update remains activated until the user deactivates it. After the deactivation of the locking, all location update attempts also between different networks are performed in a normal manner.

When comparing the above alternative manners of implementation, the use of locking code may be considered more limited, because it lengthens messages sent by the base station BS and a locking code cannot actually be used for other purposes. For the MS, it may be the more uncomplicated alternative. Another case, in which the network indentifier can be derived from the base station identifier BSI, for instance, is preferable, because the base station identifier is generally utilized for other functions as well and is sent anyway. The cellular network is thus not supposed to have any new functionality, but the implementation of the locking function depends on the functionality of the mobile station MS only. For the MS, this alternative may be more complicated. However, the function according to the invention can be implemented in both cases also in mobile terminals available at present by relatively minor changes in software.

Figure 2:
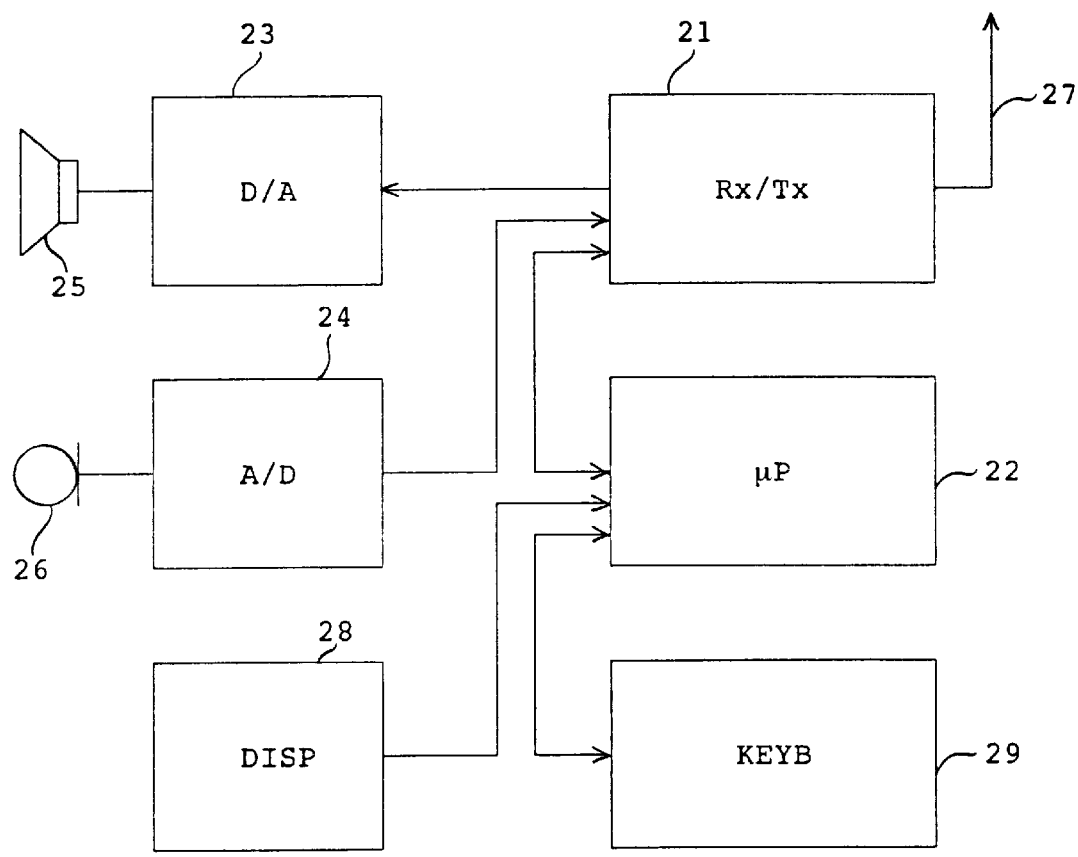

FIG. 2 shows a general block diagram of one mobile station MS to which the invention may be applied. The MS comprises a transceiver 21 connected to an antenna 27, in which transceiver the receiver is connected via digital-analog and base frequency circuits 23 to a loudspeaker 25 and in which the transmitter is connected via analog-digital converter and base frequency circuits 24 to a microphone 26. The operation of the MS is controlled by a microprocessor 22 processing the signaling sent and received by the transceiver. A user interface comprises a display 28 and a keyboard 29, which are connected to the microprocessor 22. The invention may be realized by changing the software of the microprocessor 22 so that it performs the inventive functions described above.

The figure and the description associated with it are only intended to illustrate the present invention. As to the details, the cellular radio network according to the invention may vary within the scope and spirit of the attached claims.

I claim:

1. A cellular radio network, said network comprising:
    a primary network having a first location area configuration;
    a plurality of mobile radio stations, each capable of moving in said primary network from one location area to another and of automatically starting a location updating procedure in said cellular network each time a changeover from one location area of said primary network to another is observed;
    at least one other network having a second location area configuration differing from said first location area configuration;
    at least one base station of said primary network is arranged to transmit transmissions which contain a first locking code, wherein at least one base station of said at least one other network is arranged to transmit transmissions which contain a second locking code;
    at least some of said mobile radio stations being capable of moving in said at least one other network; and
    at least some of said mobile radio stations comprising a prevention means which, when activated by a user, temporarily prevents the respective mobile radio station from initiating automatic location updatings to other networks from the network used at the time of activation, wherein
        said prevention means is capable of distinguishing the location areas of said primary network and said at least one other network from each other by said locking codes,
        said prevention means is responsive to manual activation by said user for storing the locking code sent by the respective present network in a memory, and
        said prevention means is responsive to an observation of a change of location area for comparing said stored locking code with a locking code received from a base station of a new location area, a) for allowing location updating if the locking codes are identical, and
   for preventing location updating if the locking codes are different or said base station of said new location area sends no locking code at all.

2. A cellular radio network according to claim 1, wherein said primary network and said at least one other network have respective base stations which send network configuration information, wherein a network identifier is contained in or derivable from said network configuration information, and wherein
   each of said at least some mobile stations is capable of distinguishing the location areas of said primary network and of said at least one other network from each other by means of said network identifier.

3. A cellular radio network according to claim 1, wherein said prevention means is responsive to manual activation by said user for storing a network identifier of the respective current network in a memory, and
   said prevention means is responsive to an observation of a change of location area for comparing said stored network identifier with a network identifier received in network configuration information from a base station of a new location area,
   a) for allowing location updating if the network identifiers are identical, and
   b) for preventing location updating if the network identifiers are different.

4. A cellular radio system according to claim 1, wherein with said prevention means inactivated, each of said some mobile stations is arranged to initiate an automatic location updating procedure each time when each of said some mobile stations moves from one location area to another.

5. A cellular radio network according to claim 1, wherein said at least one other network comprises at least one complementary network having a second location area configuration differing from said first location area configuration, and
   said mobile radio stations are capable of moving in said primary network, in said at least one complementary network, and between said networks.

6. A cellular radio network according to claim 5, wherein said primary network and said at least one other network have respective base stations which send network configuration information, wherein a network identifier is contained in or derived from said network configuration information, and wherein
   each of said at least some mobile stations is capable of distinguishing the location areas of said primary network and of said at least one other network from each other by means of said network identifier.

7. A mobile radio station for a cellular radio network, said cellular radio network includes a primary network having a first location area configuration and at least one other network having a second location area configuration differing from said first location area configuration, said networks having base stations, said mobile radio station being capable of moving in said primary network from one location area to another and of automatically starting a location updating procedure in said cellular network each time a changeover from one location area of said primary network to another is observed, said mobile radio station comprising:
   means for initiating automatic location updatings to other networks; and
   prevention means which, responsive to activation by a user, temporarily prevents said mobile station from initiating automatic location updatings to other networks from the network used at the time of activation, wherein
      said prevention means is capable of distinguishing the location areas of the different networks from each other by different locking codes sent by base stations of said primary network and said at least one other network,
      said prevention means is responsive to manual activation by said user for storing a locking code sent by the respective present network in a memory, and
      said prevention means is responsive to an observation of a change of location area for comparing said stored locking code with a locking code received from a base station of said new location area
      a) for allowing location updating if the locking codes are identical, and
      b) for preventing location updating if the locking codes are different or said base station of said new location area sends no locking code at all.

8. A mobile radio station for a cellular radio network, said cellular radio network includes a primary network having a first location area configuration and at least one other network having a second location area configuration differing from said first location area configuration, said networks having base stations, said mobile radio station being capable of moving in said primary network from one location area to another and of automatically starting a location updating procedure in said cellular network each time a changeover from one location area of said primary network to another is observed, said mobile radio station comprising:
   means for initiating automatic location updatings to other networks; and
   prevention means which, responsive to activation by a user, temporarily prevents said mobile station from initiating automatic location updatings to other networks from the network used at the time of activation, wherein said mobile radio station is capable of distinguishing the location areas of said primary network and said at least one other network from each other by a network identifier contained in or derived from the network configuration information sent by said base stations,
      said prevention means is responsive to activation by said user for storing the identifier of the present network in a memory, and
      said prevention means is responsive to an observation of a change of location area for comparing said stored network identifier with a network identifier received from the network configuration information sent a base station of a new location area,
      a) for allowing location updating if the network identifiers are identical, and
      b) for preventing location updating if the network identifiers are different.

9. A method for controlling automatic location updating by a mobile radio station in a cellular radio network, said cellular network including a primary network having a first location area configuration; a plurality of mobile radio stations, each capable of moving in said primary network from one location area to another and of automatically starting a location updating procedure in said cellular network each time a changeover from one location area of said primary network to another is observed; at least one other network having a second location area configuration differing from said first location area configuration; at least some of said mobile radio stations being capable of moving in said at least one other network; and at least some of said mobile radio stations including prevention means which, when activated by a user, temporarily prevents the respective mobile radio station from initiating automatic location updatings to other networks from the network used at the time of activation, said method comprising:

responsive to manual activation by said user, storing a network identifier of the respective current network in a memory, and responsive to an observation of a change of location area, comparing said stored network identifier with a network identifier received in network configuration information from a base station of a new location area,
  a) for allowing location updating if the network identifiers are identical, and
  b) for preventing location updating if the network identifiers are different.

10. A method for controlling automatic location updating by a mobile radio station in a cellular radio network, said cellular network including a primary network having a first location area configuration; a plurality of mobile radio stations, each capable of moving in said primary network from one location area to another and of automatically starting a location updating procedure in said cellular network each time a changeover from one location area of said primary network to another is observed; at least one other network having a second location area configuration differing from said first location area configuration; at least some of said mobile radio stations being capable of moving in said at least one other network; and at least some of said mobile radio stations including prevention means which, when activated by a user, temporarily prevents the respective mobile radio station from initiating automatic location updatings to other networks from the network used at the time of activation, said method comprising:

responsive to manual activation by said user, storing the locking code sent by the respective present network in a memory; and responsive to an observation of a change of location area, comparing said stored locking code with a locking code received from a base station of a new location area,
  a) for allowing location updating if the locking codes are identical, and
  b) for preventing location updating if the locking codes are different or said base station of said new location area sends no locking code at all.

11. A cellular radio network, said network comprising:
a primary network having a first location area configuration;
a plurality of mobile radio stations, each capable of moving in said primary network from one location area to another and of automatically starting a location updating procedure in said cellular network each time a changeover from one location area of said primary network to another is observed;
at least one other network having a second location area configuration differing from said first location area configuration;
at least one base station of said primary network is arranged to transmit transmissions which contain a first locking code, wherein at least one base station of said at least one other network is arranged to transmit transmissions which contain a second locking code;
at least some of said mobile radio stations being capable of moving in said at least one other network; and
at least some of said mobile radio stations comprising a location discriminator which, when activated by a user, temporarily prevents the respective mobile radio station from initiating automatic location updatings to other networks from the network used at the time of activation, wherein said location discriminator is capable of distinguishing the location areas of said primary network and said at least one other network from each other by said locking codes, said location discriminator is responsive to manual activation by said user for storing the locking code sent by the respective present network in a memory, and said location discriminator is responsive to an observation of a change of location area for comparing said stored locking code with a locking code received from a base station of a new location area,
  a) for allowing location updating if the locking codes are identical, and
  b) for preventing location updating if the locking codes are different or said base station of said new location area sends no locking code at all.

12. A cellular radio network according to claim 11, wherein said primary network and said at least one other network have respective base stations which send network configuration information, wherein a network identifier is contained in or derivable from said network configuration information, and wherein each of said at least some mobile stations is capable of distinguishing the location areas of said primary network and of said at least one other network from each other by said network identifier.

13. A cellular radio network according to claim 11, wherein said location discriminator is responsive to manual activation by said user for storing a network identifier of the respective current network in a memory, and said location discriminator is responsive to an observation of a change of location area for comparing said stored network identifier with a network identifier received in network configuration information from a base station of a new location area,
  a) for allowing location updating if the network identifiers are identical, and
  b) for preventing location updating if the network identifiers are different.

14. A cellular radio system according to claim 11, wherein with said location discriminator inactivated, each of said some mobile stations is arranged to initiate an automatic location updating procedure each time when each of said some mobile stations moves from one location area to another.

15. A cellular radio network according to claim 11, wherein said at least one other network comprises at least one complementary network having a second location area configuration differing from said first location area configuration, and said mobile radio stations are capable of moving in said primary network, in said at least one complementary network, and between said networks.

16. A cellular radio network according to claim 15, wherein said primary network and said at least one other network have respective base stations which send network configuration information, wherein a network identifier is contained in or derived from said network configuration information, and wherein each of said at least some mobile stations is capable of distinguishing the location areas of said primary network and of said at least one other network from each other by said network identifier.

17. A mobile radio station for a cellular radio network, said cellular radio network includes a primary network having a first location area configuration and at least one other network having a second location area configuration differing from said first location area configuration, said networks having base stations, said mobile radio station being capable of moving in said primary network from one location area to another and of automatically starting a location updating procedure in said cellular network each time a changeover from one location area of said primary network to another is observed, said mobile radio station comprising:

an updating initiator for initiating automatic location updatings to other networks; and a location discriminator which, responsive to activation by a user, temporarily prevents said mobile station from initiating automatic location updatings to other networks from the network used at the time of activation, wherein said location discriminator is capable of distinguishing the location areas of the different networks from each other by different locking codes sent by base stations of said primary network and said at least one other network, said location discriminator is responsive to manual activation by said user for storing a locking code sent by the respective present network in a memory, and said location discriminator is responsive to an observation of a change of location area for comparing said stored locking code with a locking code received from a base station of said new location area a) for allowing location updating if the locking codes are identical, and b) for preventing location updating if the locking codes are different or said base station of said new location area sends no locking code at all.

18. A mobile radio station for a cellular radio network, said cellular radio network includes a primary network having a first location area configuration and at least one other network having a second location area configuration differing from said first location area configuration, said networks having base stations, said mobile radio station being capable of moving in said primary network from one location area to another and of automatically starting a location updating procedure in said cellular network each time a changeover from one location area of said primary network to another is observed, said mobile radio station comprising:

an updating initiator for initiating automatic location updatings to other networks; and a location discriminator which, responsive to activation by a user, temporarily prevents said mobile station from initiating automatic location updatings to other networks from the network used at the time of activation, wherein said mobile radio station is capable of distinguishing the location areas of said primary network and said at least one other network from each other by a network identifier contained in or derived from the network configuration information sent by said base stations, said location discriminator is responsive to activation by said user for storing the identifier of the present network in a memory, and said location discriminator is responsive to an observation of a change of location area for comparing said stored network identifier with a network identifier received from the network configuration information sent a base station of a new location area, a) for allowing location updating if the network identifiers are identical, and b) for preventing location updating if the network identifiers are different.

19. A method for controlling automatic location updating by a mobile radio station in a cellular radio network, said cellular network including a primary network having a first location area configuration; a plurality of mobile radio stations, each capable of moving in said primary network from one location area to another and of automatically starting a location updating procedure in said cellular network each time a changeover from one location area of said primary network to another is observed; at least one other network having a second location area configuration differing from said first location area configuration; at least some of said mobile radio stations being capable of moving in said at least one other network; and at least some of said mobile radio stations including a location discriminator which, when activated by a user, temporarily prevents the respective mobile radio station from initiating automatic location updatings to other networks from the network used at the time of activation, said method comprising:

responsive to manual activation by said user, storing a network identifier of the respective current network in a memory, and responsive to an observation of a change of location area, comparing said stored network identifier with a network identifier received in network configuration information from a base station of a new location area, a) for allowing location updating if the network identifiers are identical, and b) for preventing location updating if the network identifiers are different.

20. A method for controlling automatic location updating by a mobile radio station in a cellular radio network, said cellular network including a primary network having a first location area configuration; a plurality of mobile radio stations, each capable of moving in said primary network from one location area to another and of automatically starting a location updating procedure in said cellular network each time a changeover from one location area of said primary network to another is observed; at least one other network having a second location area configuration differing from said first location area configuration; at least some of said mobile radio stations being capable of moving in said at least one other network; and at least some of said mobile radio stations including a location discriminator which, when activated by a user, temporarily prevents the respective mobile radio station from initiating automatic location updates to other networks from the network used at the time of activation, said method comprising:

responsive to manual activation by said user, storing the locking code sent by the respective present network in a memory; and responsive to an observation of a change of location area, comparing said stored locking code with a locking code received from a base station of a new location area, a) for allowing location updating if the locking codes are identical, and b) for preventing location updating if the locking codes are different or said base station of said new location area sends no locking code at all.

* * * * *